March 6, 1934.  J. R. SCOHY ET AL  1,950,328

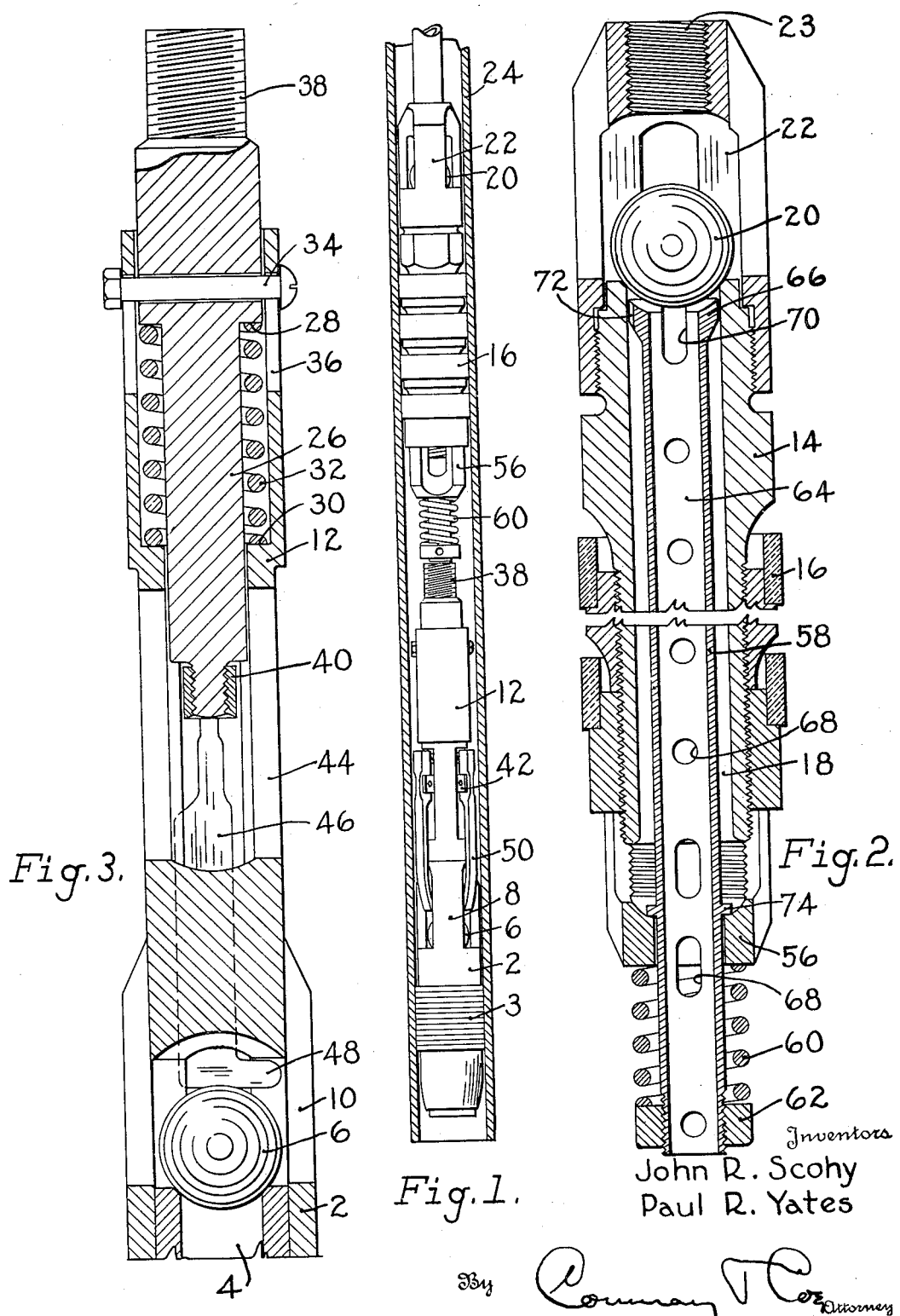

VALVE RELEASE

Filed June 9, 1932  2 Sheets-Sheet 2

Inventors
John R. Scohy
Paul R. Yates
By Conmany Rose
Attorney

Patented Mar. 6, 1934

1,950,328

UNITED STATES PATENT OFFICE 1,950,328

VALVE RELEASE

John R. Scohy and Paul R. Yates, Okmulgee, Okla.

Application June 9, 1932, Serial No. 616,300

6 Claims. (Cl. 103—221)

Our invention relates to valve releases and more particularly to such devices for use in oil wells.

The tubing of an oil well 2000 feet deep and 2 inches in diameter will hold eight barrels of oil. When it is necessary to pull the tubing, this oil may form gas pressure or may be forced up with the tubing. This oil is likely to flow over the workers and cause loss of considerable time and some inconvenience.

The object of the present invention is to provide a device which will do away with this flow of oil in pulling tubing.

More particularly, our invention relates to the standing and working valves of an oil well. Its object is to provide means to hold both of these valves open whenever it is desirable in draining the well or in pulling tubing.

A further object of our invention is to provide means first to displace the standing valve from its seat so as to break the pressure thereon and then to raise this valve bodily so as to keep it fully open.

Another object is to provide valves of this type which are controlled without any special connections and merely by the weight of the operating rod.

Further objects and advantages will appear more fully from the following description when taken in conjunction with the accompanying drawings which form a part thereof.

In the drawings:

Fig. 1 is a side elevation showing the pumping assembly mounted in a well.

Fig. 2 is a cross section through the working valve assembly.

Fig. 3 is a cross section through the standing valve assembly.

Figure 4:
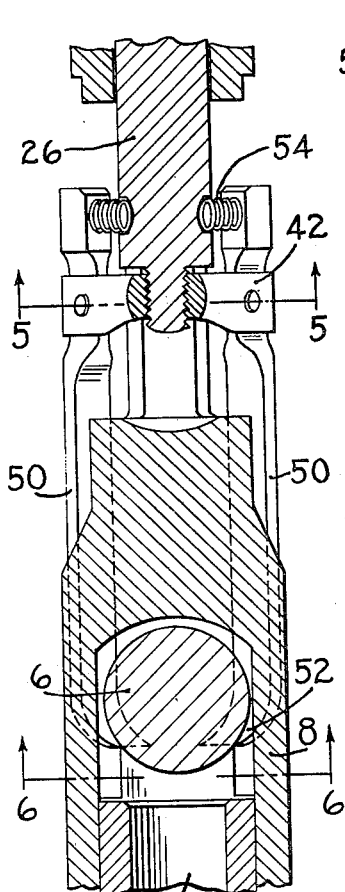
Fig. 4 is a detail cross section through a portion of the standing valve assembly.
Figure 5:
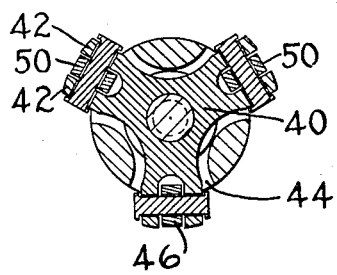
Figure 6:
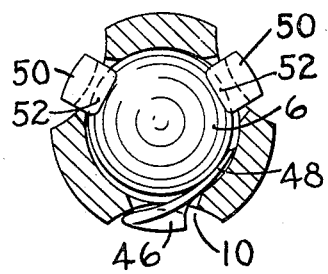

Figs. 5 and 6 are cross sections on the lines 5—5 and 6—6 respectively of Fig. 4.

Figure 7:
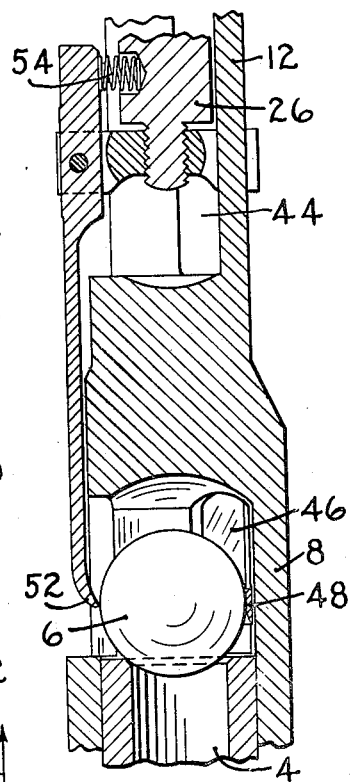

Fig. 7 is a detail cross section showing the finger in displacing position.

Figure 8:
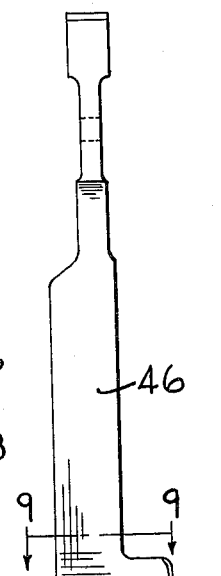

Fig. 8 is a detail view of the displacing finger.

Figure 9:
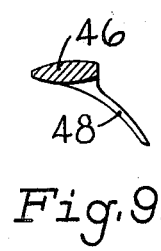

Fig. 9 is a cross section on the line 9—9 of Fig. 8.

The lower or standing valve (Fig. 3) includes a cylindrical portion 2 which is adapted to be fixedly mounted at the bottom of the tubing or working barrel, completely filling the same with the aid of packing 3. A passage 4 is provided through the portion 2, and a ball valve 6 is seated in the upper end of the passage. This ball valve is inside a cage 8 having slots 10 which prevents loss of the ball 6. Above the cage is a hollow cylindrical extension 12 of reduced size.

The moving or working valve (Fig. 2) consists of a cylinder 14 carrying packing 16. A passage 18 extends through the cylinder, the upper part of the passage being closed by a ball valve 20 kept in position by a cage 22. A threaded opening 23 in the top of the cage provides a connection for a pump rod.

The above construction is conventional, and it is quite evident that as the working valve is moved up and down oil will be pumped upward through the tubing 24.

In order to displace the ball valve 6 and to hold it in raised position, a mechanism is provided including a plunger 26 slidably mounted in the cylindrical portion 12. This plunger has an external shoulder 28, between which and an internal shoulder 30 on the extension 12 is a coil spring 32. A bolt 34 extends through the plunger 26 and through slots 36 in the extension 12 so as to limit the movement of the plunger. The upper end of the plunger is threaded as at 38 so that the standing valve may be drawn up out of the well by suitable devices.

The lower end 40 of the plunger is provided with three ears 42 extending through slots 44 in the lower part of the extension 12. Pivotally mounted on one of these ears is a finger 46 (Fig. 9) having on its lower end an angular portion 48. This finger extends through one of the slots 10 and the portion 48 is inside the cage near one of the walls thereof. The finger is so arranged that, when it is depressed, it will strike the ball 6 near one side thereof and will push the ball to one side and off its seat. On the other two lugs two fingers 50 are pivoted, each extending into one of the slots 10 and having at its lower end an inwardly turned gripping portion 52. Springs 54 are provided between the upper ends of the fingers 50 and the end 40 of the plunger.

The working valve (Fig. 2) has at its lower end a cage 56. A rod 58 is slidable through this cage and the opening 18, being normally urged to its lowest position by a spring 60 located between the cage 56 and a nut or the like 62 on the end of rod 58. A passage 64 extends longitudinally through the rod 58. The upper end 66 of the rod 58 fits tightly within the passage 18, while the remainder of the rod is of reduced size. A number of holes 68 open through the rod at various points along its length, and a portion of the upper end 66 is notched or cut away as at 70. Further notches 72 may be provided on the outer surface of the end 66. Any other means of permitting oil to flow around or past the rod 58 and through the passage 18 when the valve 22 is displaced may be used. A shoulder 74 limits downward movement of the rod 58.

During the usual pumping operation, the two valves work in the usual way. However, when it is necessary to pull the tubing, the working valve is lowered onto the standing valve and the weight of the rod which operates the working valve is allowed to act on the two valves, tending to overcome the springs therein. By the exertion of a slight additional force, the plunger 26 can now be depressed to its lowest position. During such movement, the portion 48 of the finger 46 moves in between the wall of the cage and the ball 6, the finger being thicker than the space between the ball and wall so that the ball is pushed to one side and off its seat. The fingers 50 now also engage the ball, so that it is held by the three fingers. Upon the release of the additional pressure on the rod, the spring 32 will partly raise the plunger 26, thereby lifting the ball 6 away from its seat.

The weight of the rod also compresses the spring 60 and pushes the rod 58 upward, thereby lifting the ball 20 from its seat.

When the above procedure has been followed, the oil will flow from the well past ball 20, through openings 68 and through and around hollow rod 58, through the slots in cages 56 and 8, and past ball 6 through passage 4. All the oil will thus drain from the well and be returned to the sand, and the pipe may be pulled without producing any flow of oil. If oil is standing in the well, the tubing and valves may be pulled together, as the weight of the rod will be sufficient to keep the valves at least partly open, so that even if they are pulled up with the last section of pipe the oil can drain through.

After the standing valve is taken out, a sharp blow is enough to release the valve 6 so that the arrangement is ready for use.

The spring 32 should be slightly stronger than the spring 60 so as to raise the ball 6 from its seat against the weight of the rod while the spring 60 is compressed enough to hold the ball 20 in raised position.

The finger 46 is needed in order to push the valve off its seat and thereby to release a part of the pressure on top of the valve. Without such provision, the fingers cannot raise the valve against the weight of the oil in the well. However, the fingers lift the ball high enough to permit a quick, smooth flow of oil, which cleans the valve seat and does not cause uneven wear. In lowering the valve into a well, the ball may be held by the gripping fingers 50 so that it will not stick to the seat. A sharp blow on the working rod will release this grip.

While we have described herein one embodiment of our invention, we wish it to be understood that we do not intend to limit ourselves thereby except within the scope of the appended claims.

We claim:

1. In a device of the class described, a valve seat, a ball valve on said seat, a cage having a slot therein around said ball valve having walls slightly spaced from said ball, said slot extending below the center of said ball valve when in its lowered position, a vertically movable finger secured at its upper end to a point outside the cage extending through said slot and having a portion extending substantially circumferentially from its lower end within said cage adjacent one wall thereof thicker than the space between the wall of the cage and the ball, whereby downward movement of said finger displaces said ball from its seat in a radial direction substantially at right angles to the direction of movement of said finger.

2. In a device of the class described, a valve seat, a ball valve on said seat, a cage having slots therein around said ball valve having walls slightly spaced from said ball, a finger extending through one of said slots, said cage having a wall portion extending substantially at least as high as the center of said ball valve, said finger having a portion within said cage adjacent said wall portion thereof thicker than the space between the wall portion of the cage and the ball and in vertical alignment with said space, whereby downward movement of said finger displaces said ball from its seat in a direction substantially at right angles to the direction of movement of said finger, and gripping fingers extending through others of said slots adapted to grip said ball for raising the same.

3. A standing valve assembly for oil wells comprising a body portion having a passage in the lower part thereof, a valve seat at the upper end of said passage, a cage portion around said valve seat, a ball valve on said valve seat within said cage, said cage having slots therein and walls between said slots, said walls including a wall portion extending substantially at least as high as the center of said ball valve, a plunger slidably mounted in the upper part of said body portion, a finger mounted on said plunger extending through one of said cage slots, said finger having a portion within said cage adjacent said wall portion thereof thicker than the space between the wall portion of the cage and the ball and in vertical alignment with said space, whereby downward movement of said finger displaces said ball from its seat in a direction substantially at right angles to the direction of movement of said finger, a spring normally urging said plunger upward, and gripping fingers mounted on said plunger extending through others of said cage slots and cooperating with said displacing finger to grip the ball valve whereby it may be raised from its seat.

4. A standing valve assembly for oil wells comprising a body portion having a passage in the lower part thereof, a valve seat at the upper end of said passage, a cage portion around said valve seat, a ball valve on said valve seat within said cage, said cage having slots therein and walls between said slots, a plunger slidably mounted in the upper part of said body portion, the central part of said body portion having slots therein, ears on the lower end of said plunger slidable in and extending through said slots, a finger mounted on one of said ears and extending through one of said cage slots and adapted on downward movement to pass between the wall of the cage and the ball valve to displace the valve from its seat, a spring normally urging said plunger upward, and gripping fingers mounted on others of said ears extending through others of said cage slots and cooperating with said displacing finger to grip the ball valve whereby it may be raised from its seat.

5. A standing valve assembly for oil wells comprising a body portion having a passage in the lower part thereof, a valve seat at the upper end of said passage, a cage portion around said valve seat, a ball valve on said valve seat within said cage, said cage having slots therein and walls between said slots, a plunger slidably mounted in the upper part of said body portion, the central part of said body portion having slots therein, ears on the lower end of said plunger slidable in and extending through said slots, a finger mounted on one of said ears and extending through one of said cage slots and adapted on downward movement to pass between the wall of the cage and the ball valve to displace the valve from its seat, a spring normally urging said plunger upward, gripping fingers mounted on others of said ears extending through others of said cage slots and cooperating with said displacing finger to grip the ball valve whereby it may be raised from its seat, and springs arranged between the upper ends of said gripping fingers and said plunger to urge said fingers to gripping position.

6. A working valve assembly for oil wells comprising a body portion having a passage therethrough, a valve seat at the upper end of said passage, a valve on said valve seat, a tubular member slidably mounted in said passage adapted upon relative upward movement to engage said valve and lift it from its seat, and a spring normally holding said tubular member in lowered position, said tubular member having openings through its walls communicating with the interior thereof to permit the passage of oil therethrough.

JOHN R. SCOHY.
PAUL R. YATES.